United States Patent [19]
Barton et al.

[11] Patent Number: 6,026,852
[45] Date of Patent: Feb. 22, 2000

[54] PRESSURE RELIEF VALVE AND METHOD OF MANUFACTURING THE SAME

[75] Inventors: Richard J. Barton, Port Huron; Robert M. Gallagher, Detroit; Brian L. Martin, Clyde; Darlene E. Forster, Maryville, all of Mich.

[73] Assignee: Blue Water Plastics, Inc., Marysville, Mich.

[21] Appl. No.: 09/093,082

[22] Filed: Jun. 8, 1998

[51] Int. Cl.[7] .................................................. F16K 15/00
[52] U.S. Cl. ................................... 137/512.15; 137/512.1
[58] Field of Search ........................... 137/512.1, 512.15, 137/855, 856, 846; 454/162

[56] References Cited

U.S. PATENT DOCUMENTS

| | | | |
|---|---|---|---|
| 3,391,628 | 7/1968 | Ziegenfelder | 98/2 |
| 3,405,968 | 10/1968 | Feles et al. | 296/28 |
| 4,558,634 | 12/1985 | Oshiro et al. | 98/2.18 |
| 4,667,578 | 5/1987 | Hagenah | 98/2.18 |
| 4,691,623 | 9/1987 | Mizusawa | 137/512.15 |
| 4,781,106 | 11/1988 | Frien | 137/512.1 |
| 4,972,765 | 11/1990 | Dixon | 137/855 |
| 5,105,731 | 4/1992 | Kraus | 454/143 |
| 5,194,038 | 3/1993 | Klomhaus et al. | 454/162 |
| 5,263,895 | 11/1993 | Kraus | 454/162 |
| 5,354,532 | 10/1994 | Nakai et al. | 264/259 |
| 5,419,739 | 5/1995 | Lewis | 454/162 |
| 5,582,789 | 12/1996 | Stein | 264/46.4 |
| 5,601,117 | 2/1997 | Lewis et al. | 137/855 |
| 5,690,881 | 11/1997 | Horie et al. | 264/263 |

FOREIGN PATENT DOCUMENTS

| | | |
|---|---|---|
| 0728605 | 8/1996 | European Pat. Off. . |
| 2298917 | 9/1996 | United Kingdom . |

*Primary Examiner*—Denise L. Ferensic
*Assistant Examiner*—Joanne Y. Kim
*Attorney, Agent, or Firm*—Young & Basile, P.C.

[57] ABSTRACT

A pressure relief valve such as is used to relieve overpressure in the passenger compartment of an automotive vehicle has valve flaps which are retained in connection with a housing by molded-in-place retainer strips. The valve is manufactured by an injection molding tool having a pair of mold halves defining a first mold cavity for forming the housing and a second mold cavity for forming the flaps. After the housing and flaps have set, the mold is opened, with the housing remaining in contact with one mold half and the flaps remaining in contact with the other mold half. One mold half is then moved relative to the other to place the housing and the flaps in alignment with one another, and the mold halves are closed again to place the flaps inside the housing and define a third mold cavity extending along the lines of desired attachment between the flaps and the valve seats. A third quantity of thermoplastic material is injected into the third mold cavity where it sets to form the retainer strips, bonding with the edges of the flap and the adjacent edges of the valve seat. The third mold cavity also extends around a peripheral flange surrounding the housing, forming a seal which is bonded to the housing. The part is complete when ejected from the mold, with no additional assembly required.

9 Claims, 16 Drawing Sheets

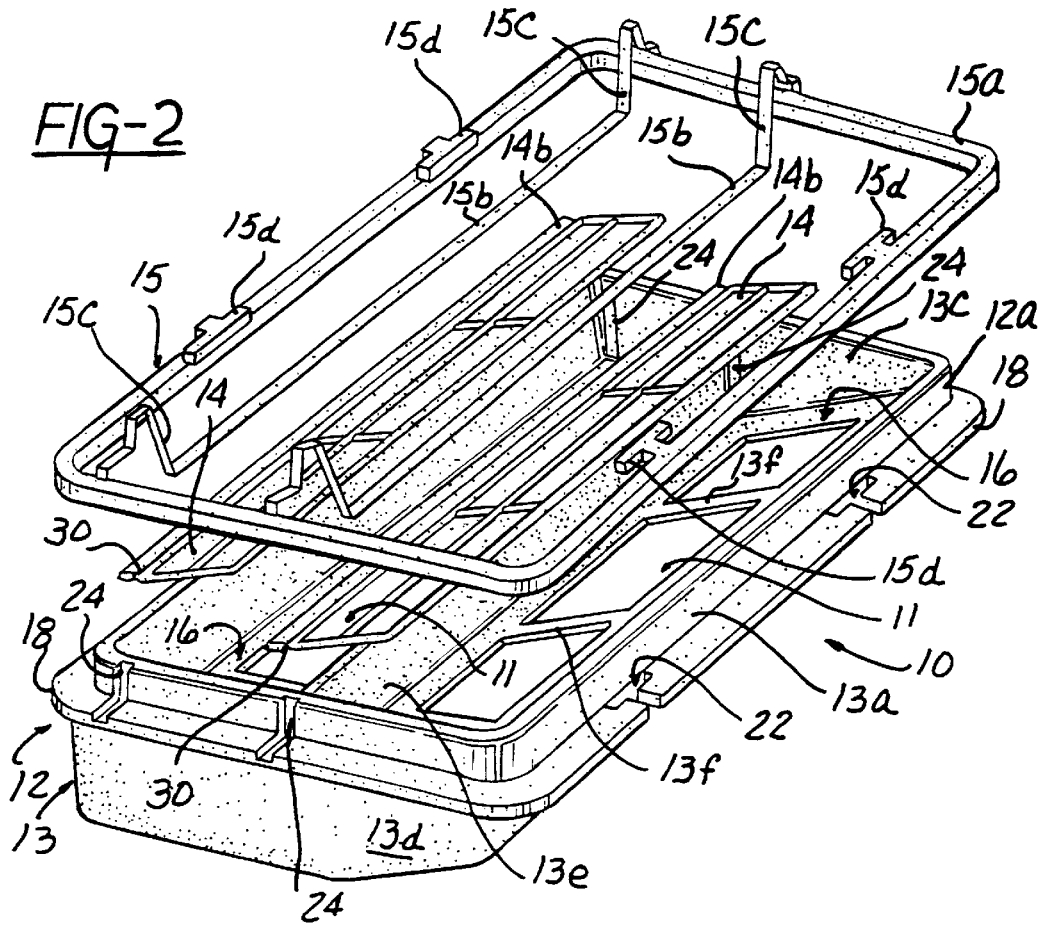
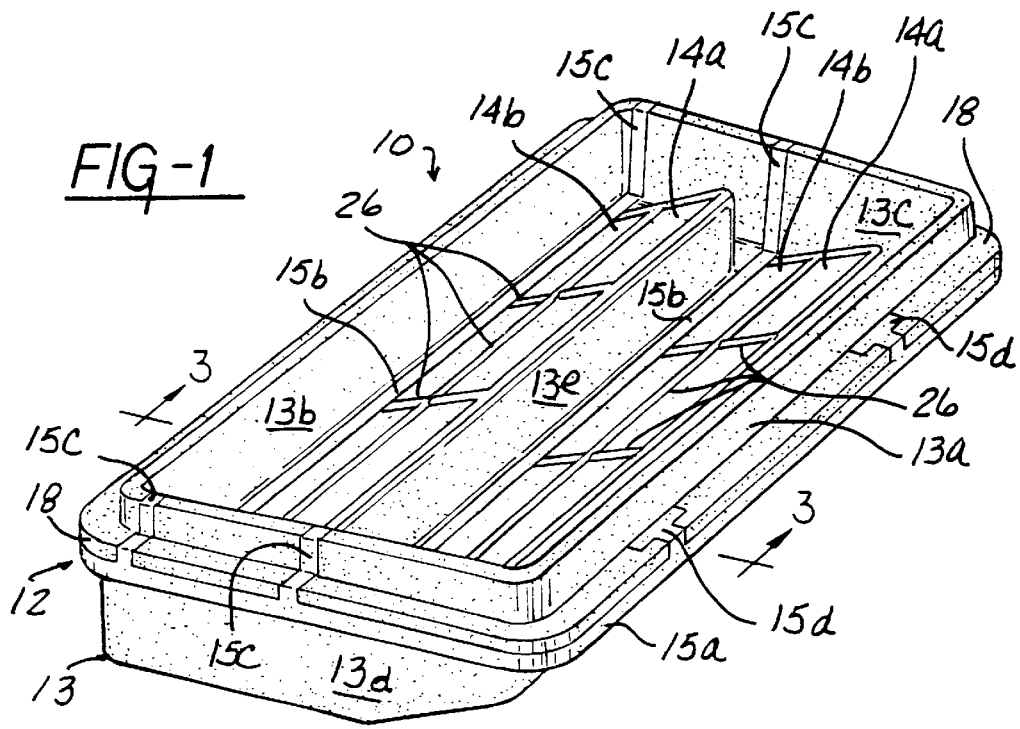

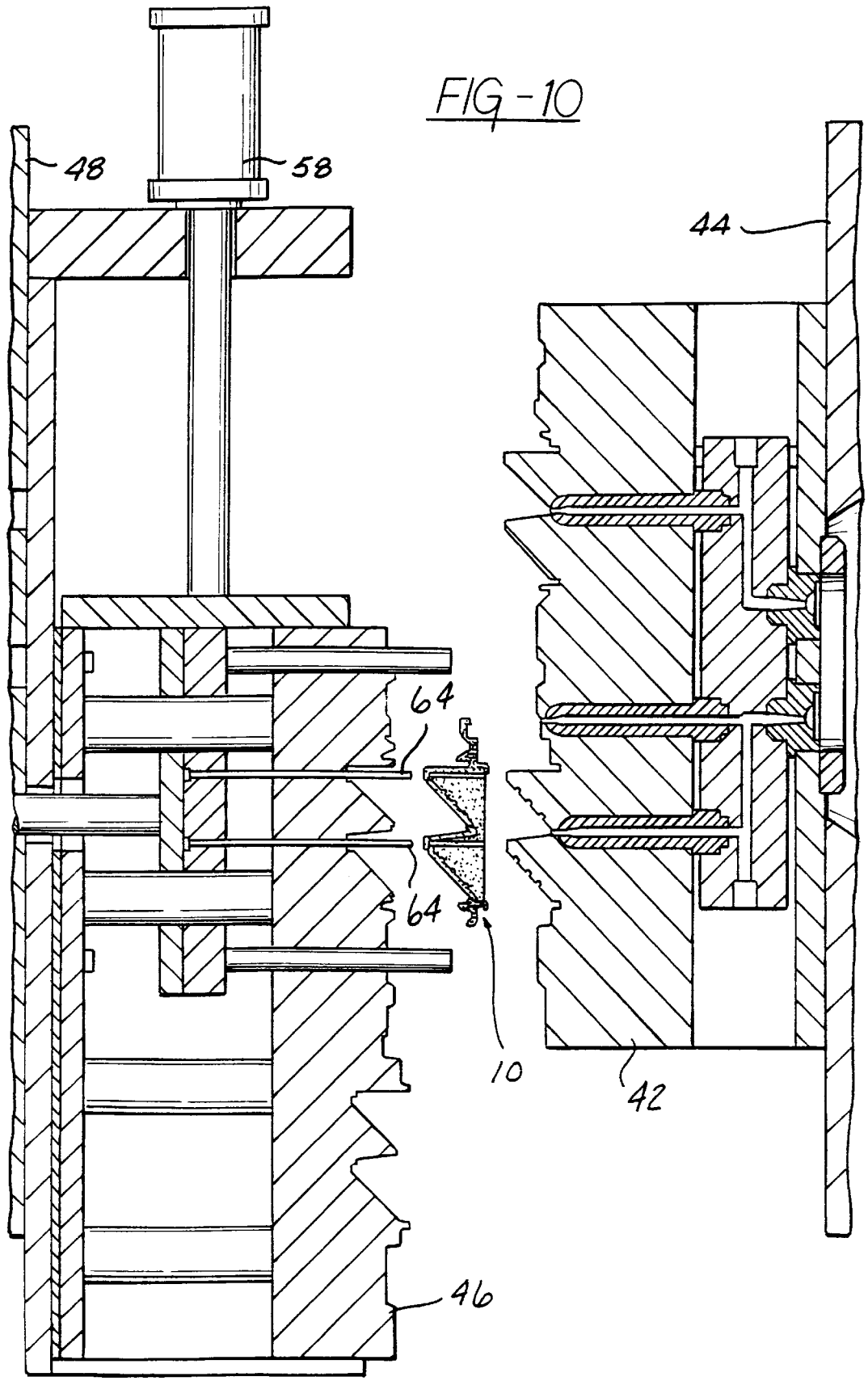

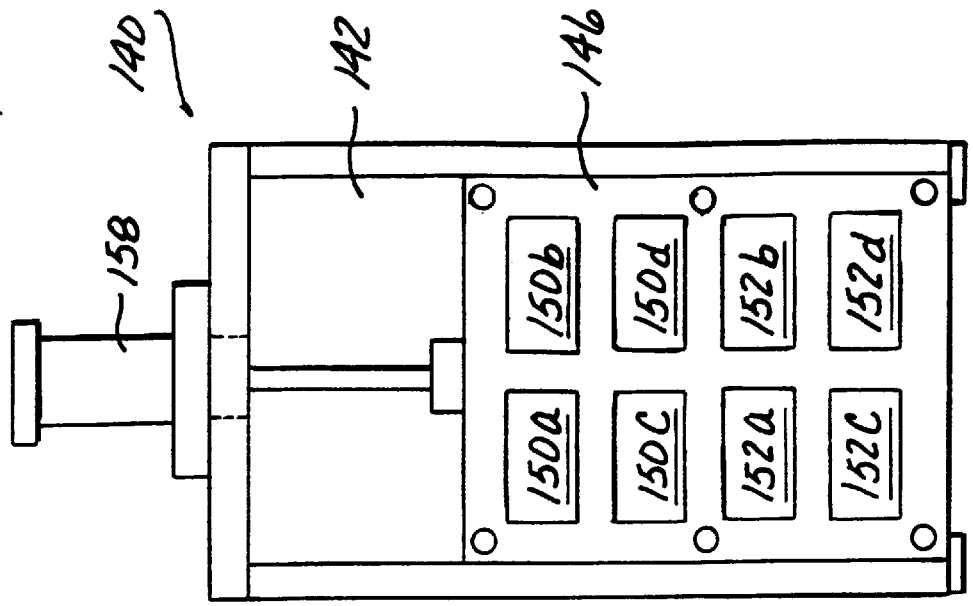
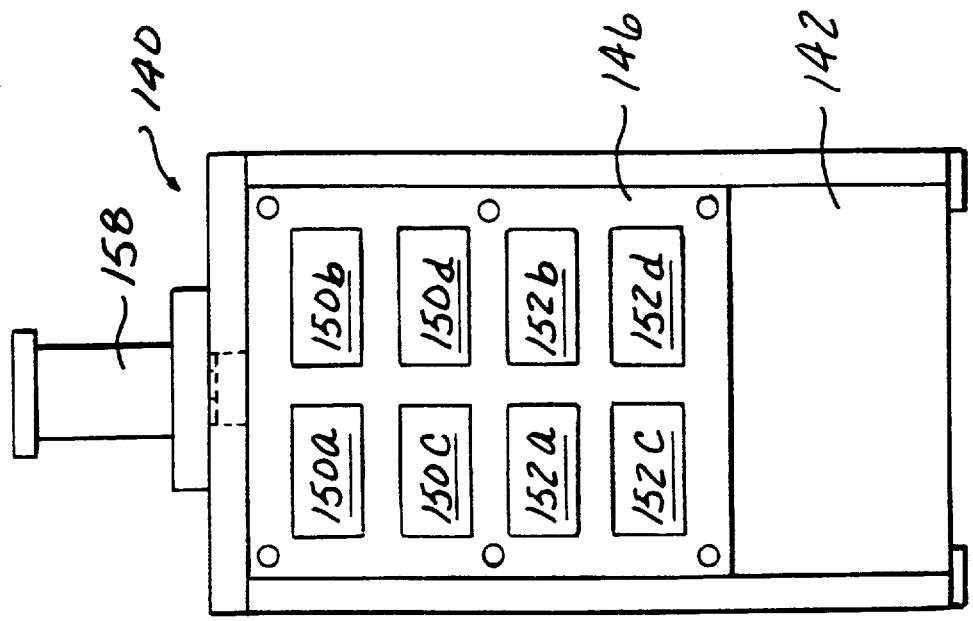

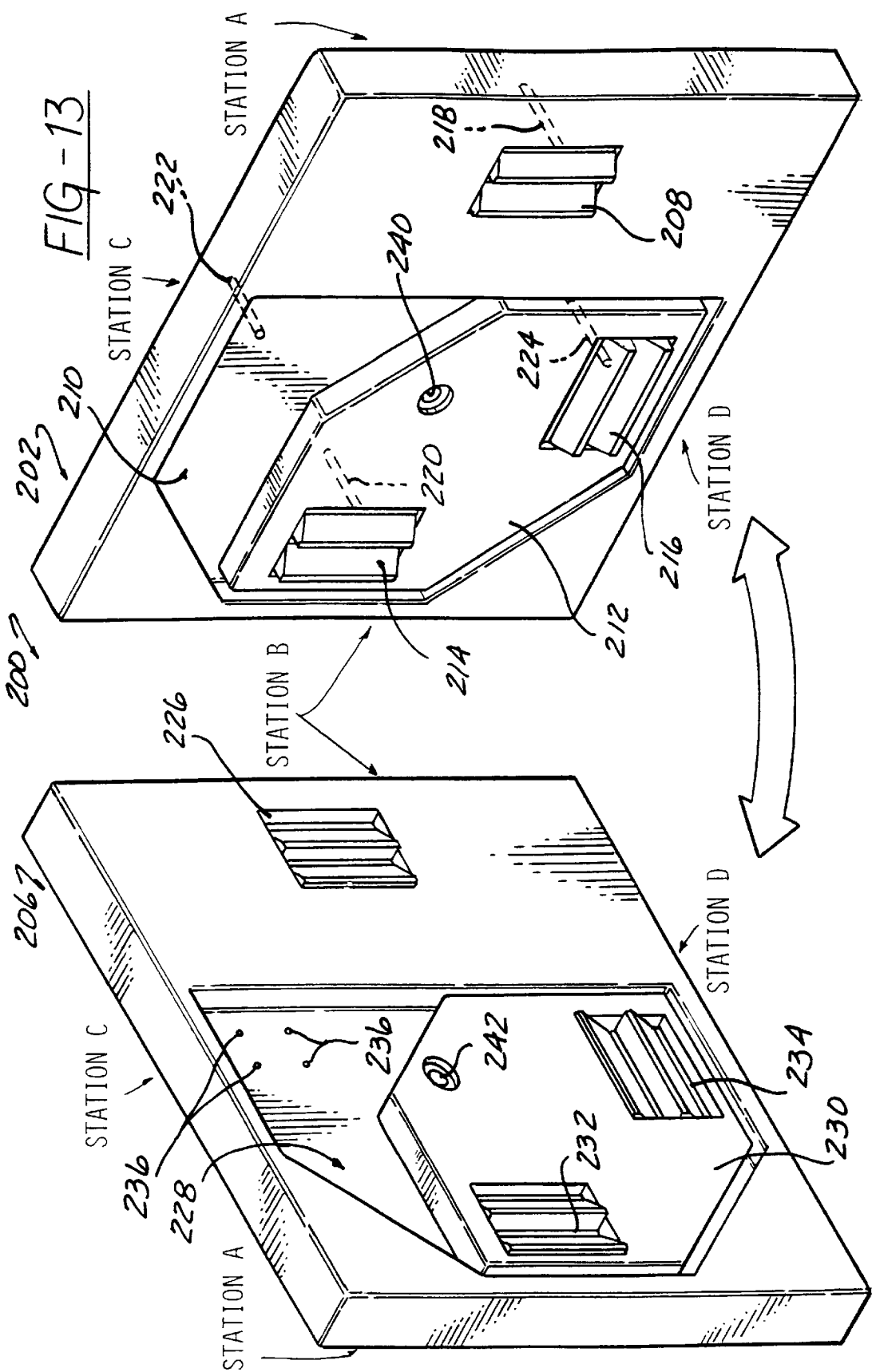

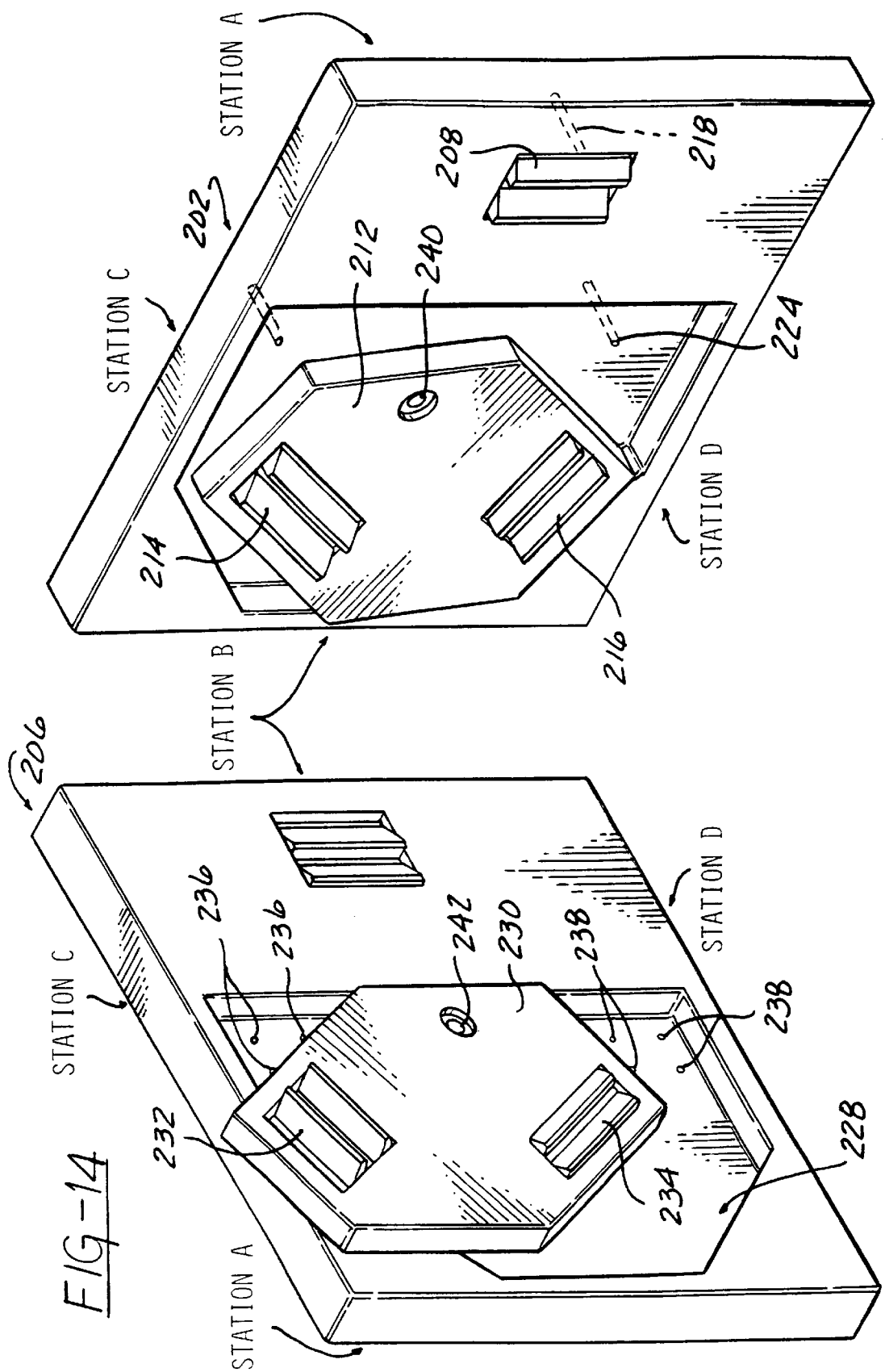

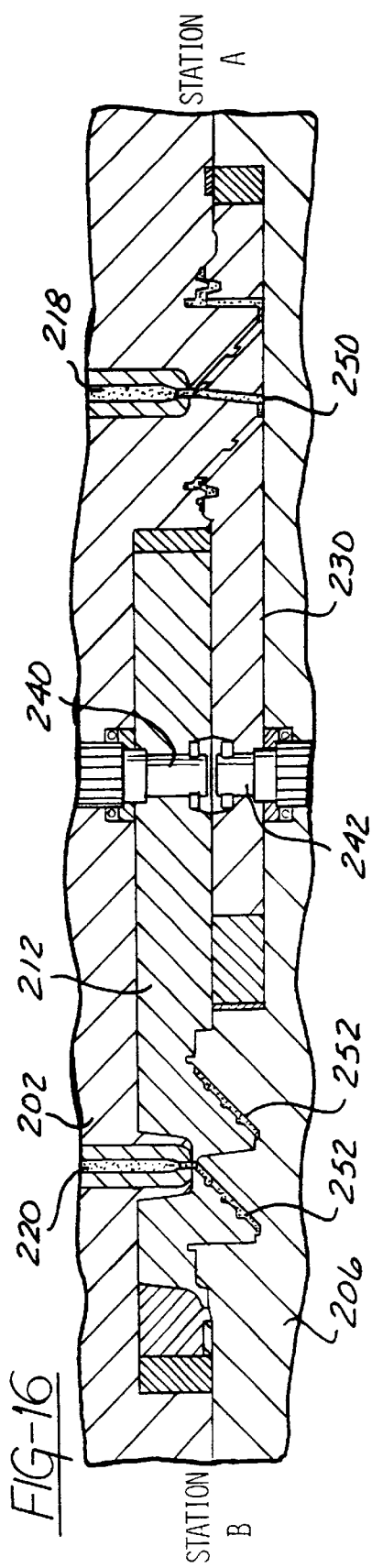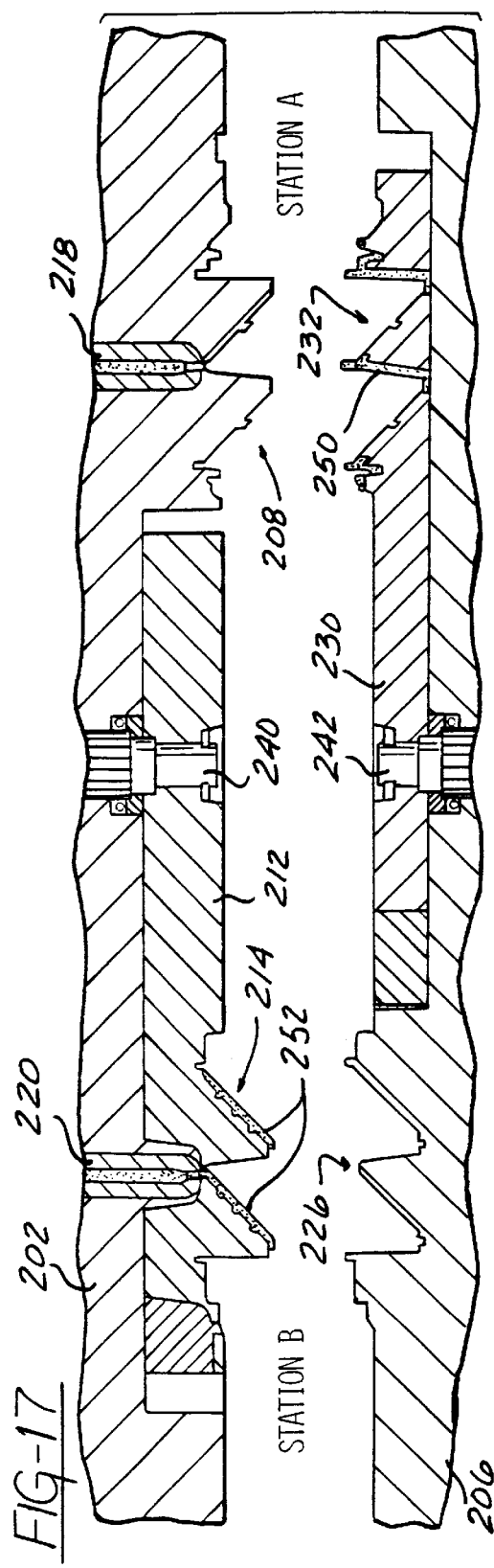

PRESSURE RELIEF VALVE AND METHOD OF MANUFACTURING THE SAME

FIELD OF THE INVENTION

This invention relates generally to one-way pressure relief valves, and in particular to such a valve for use in conjunction with a ventilation system for a passenger compartment of an automotive vehicle.

BACKGROUND OF THE INVENTION

One-way, flap-type pressure relief valves are commonly used in applications such as vehicle ventilation systems. Typically, they serve to relieve the over-pressure that may occur within a nearly air-tight passenger compartment of a vehicle when, for example, a door of the vehicle is rapidly closed, while preventing the entry of air from outside the vehicle into the passenger compartment. Valves used for this purpose generally comprise a frame or housing which is mounted to an aperture formed in a panel enclosing the passenger compartment and defines an air passageway through the panel. The valve has one or more internal valve seats over which a plurality of valve flaps lie. The flaps comprise relatively thin, flexible members and overlie the valve seats on the exterior side of the passenger compartment. Each flap is fixed to the housing along one peripheral edge. When an over-pressure condition occurs within the passenger compartment, the flaps move away from the valve seats, bending or hinging adjacent their fixed edge to allow air to flow through the air passageway out of the passenger compartment. When the air pressure has equalized on both sides of a valve or when the pressure on the exterior becomes greater, the flaps swing or bend back to engage the valve seats and block airflow into the passenger compartment.

Valves of this general type are often manufactured by injection molding the housing and the valve flaps as separate pieces and then joining the two components by any one of several different methods. U.S. Pat. No. 5,601,117 teaches that holes formed along an edge of the flap are placed over pins projecting from the corresponding portion of the housing. The ends of the pins are then flattened to form a locking cap which secures the flap over the peg. U.S. Pat. No. 5,419,739 discloses a valve flap in the form of a flexible sheet having integrally formed tabs which are forced through respective slots formed in the housing. U.S. Pat. No. 5,194,038 discloses a valve wherein the flaps are connected to the housing by molding the flaps in situ integrally with the housing, but of a different, more flexible material than that of the housing. The flap is molded such that it is engaged along one edge with a slot formed in the housing. Each of these various methods of construction has inherent disadvantages, generally related to the fact that producing the valve as separate components that must be assembled is complex, time consuming, and/or labor intensive, adding to the overall cost of the finished component.

United Kingdom Patent Application 2,298,917A discloses a valve wherein the housing and the flaps are injection molded simultaneously and in the same mold from a rigid plastic material, and a more flexible plastic is subsequently over-molded onto the housing and the flap along one edge thereof to connect the two components and form a hinge which allows swinging movement of the flap. But because of practical limitations inherent in the injection molding process, specifically the problem known as "die lock," the housing cannot be molded in a single piece in its completed configuration. Instead, wall portions of the housing against which the flaps are to seal in the completed part must be molded outside of the housing, then inserted into their operative positions inside of the housing after the over-molding has connected the flaps to the housing. These additional steps add to the complexity and cost of manufacturing the valve.

Accordingly, there is a need for a simpler, more easily manufactured design for such pressure relief valves.

SUMMARY OF THE INVENTION

The subject invention provides a pressure relief valve comprising a housing defining an air passageway and one or more valve flaps retained within the housing to limit flow through the passageway to one direction only. Each valve flap is attached to the housing along one edge by a retainer which is molded in place after the flaps have been operatively positioned within the housing. The retainer contacts and bonds with the attachment edge of the flap and also with the housing along a corresponding edge of the valve seat on which the flap rests when in a closed position. The valve flap is molded with a living hinge adjacent the attachment edge so that it may swing away from the valve seat to an open position when forced to by an over-pressure condition within the passenger compartment.

The invention pressure relief valve is easily manufacturable by a shuttle molding technique wherein a pair of mold halves, when in a first closed position relative to one another, form a first mold cavity for injection molding the housing and a separate second mold cavity for injection molding the flaps. The housing is preferably molded from a rigid thermoplastic material such as polypropylene, polystyrene or polyvinylchloride while the flaps are molded of a more flexible material, such as thermoplastic elastomer. After both of the components have set so as to be substantially solid, the mold halves are separated, with the housing remaining in contact with the first mold half and the flaps remaining in contact with the second mold half. The mold halves are then moved relative to one another, or shuttled, in a plane perpendicular to the direction of opening and closing of the mold to place the housing and the flaps in alignment with one another. The mold halves are then moved toward one another such that the flaps are inserted into the housing and placed in contact with their respective valve seats. When the mold halves are in this second closed position, a third mold cavity is formed by the mold halves. The third mold cavity extends along the line of desired attachment between the valve seat and the flap. A third quantity of thermoplastic material, preferably thermoplastic elastomer, is injected into the third mold cavity where it bonds with the edge of the flap and the adjacent edge of the valve seat to form the retainer. After the third quantity of thermoplastic material has cooled and set, the mold halves are separated and the completed part is ejected from the mold, with no additional assembly required.

The invention method allows the part to be produced in single molding operation, using a single mold tool, while avoiding problems with "die lock." That is, the method prevents the flaps from interfering with the molding of the valve seats on which they lie in the completed part.

According to a further feature of the invention, a seal surrounding the housing is formed simultaneously with the retainers during the injection of the third quantity of thermoplastic material. This is achieved by shaping the third mold cavity such that it extends around and contacts the periphery of the housing. The thermoplastic material flows into this portion of the cavity and bonds to the housing when it sets. The resulting seal contacts the edges of the aperture in the panel into which the valve is installed. The flexible material used for the seal provides a more air-tight seal between the housing and the panel than would be the case if the rigid material of the housing made direct contact with the panel, as well as reducing noise due to vibration. Forming the seal and the retainer simultaneously during a single injection molding step is a quick and efficient way to create a pressure relief valve having the design characteristics of the present invention.

BRIEF DESCRIPTION OF THE DRAWINGS

FIG. 1 is a perspective view of a pressure relief valve according to the invention;

FIG. 2 is an exploded view of the valve of FIG. 1;

FIG. 10 is a view of the completed valve being ejected from the molding tool;

FIG. 11 is an elevation end view of a molding tool used to simultaneously produce four valves according to the present invention;

FIG. 12 is a view of the molding tool of FIG. 11 with the mold halves shifted with respect to one another;

FIG. 13 is a perspective view of another molding tool, with the mold halves rotated away from one another and pivot plates in a first position;

FIG. 14 is view of the molding tool of FIG. 13 with pivot plates in an intermediate position;

FIG. 16 is a horizontal cross-section through the molding tool of FIG. 13, with the mold halves in a closed position;

FIG. 17 is a horizontal cross-section through the molding tool of FIG. 13, with the mold halves in an open position;

DETAILED DESCRIPTION OF THE PREFERRED EMBODIMENT

FIGS. 1 and 2 best illustrate the overall arrangement of the preferred embodiment of a pressure relief valve 10 formed in accordance with the present invention. Generally, the valve 10 comprises a housing 12, a pair of valve flaps 14 and a retainer and seal assembly 15. The housing 12 is preferably formed of a rigid plastic material, such as polypropylene, polystyrene or polyvinylchloride, and is adapted to fit into a rectangular aperture formed in a panel (not shown) to control the flow of air (or some other gas) through the aperture. Each of the valve flaps 14 is preferably composed of a relatively pliable plastic material, such as thermoplastic elastomer, and is attached to the housing 12 along one edge so that the opposite edge may swing or hinge away from the housing 12 under the influence of air pressure. The seal and retainer assembly 15, as is explained in detail hereinbelow, is molded in place in the position shown in FIG. 1 to connect the flaps 14 to the housing 12 along their fixed edges and to provide a seal surrounding the housing 12.

When used as a component in a ventilation system for a passenger compartment of an automotive vehicle, the invention pressure relief valve 10 is inserted into an aperture in a panel defining the passenger compartment of the vehicle such that the flap may swing outwardly, away from the interior of the compartment. In this fashion, the valve 10 serves to relieve the over-pressure within the passenger compartment which may occur when, for example, a door of the vehicle is rapidly closed, while preventing the entry of air from outside the vehicle into the passenger compartment.

Figure 3:
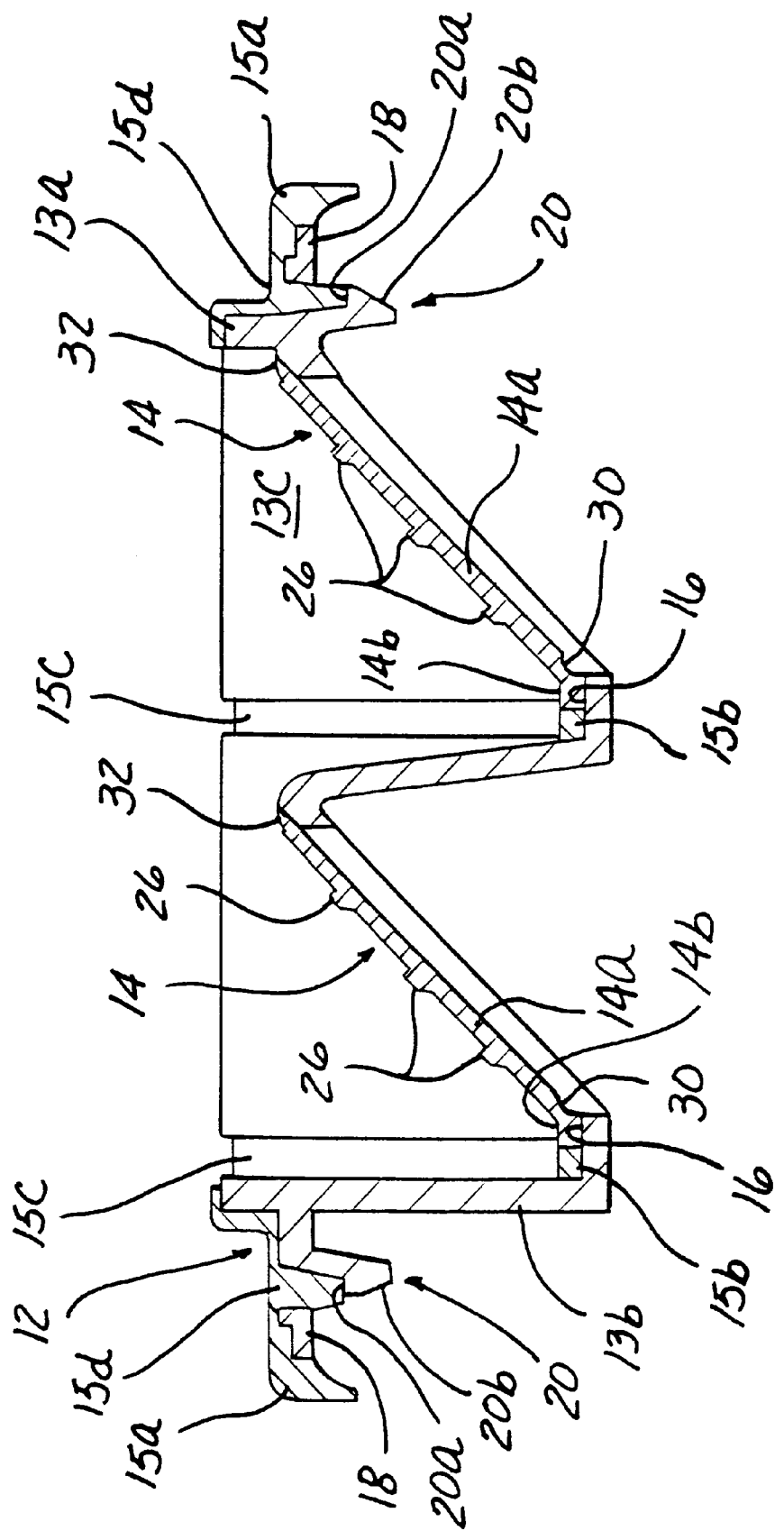
FIG. 3 is a cross-sectional view of the valve taken along line 3—3 of FIG. 1.
Figure 4:
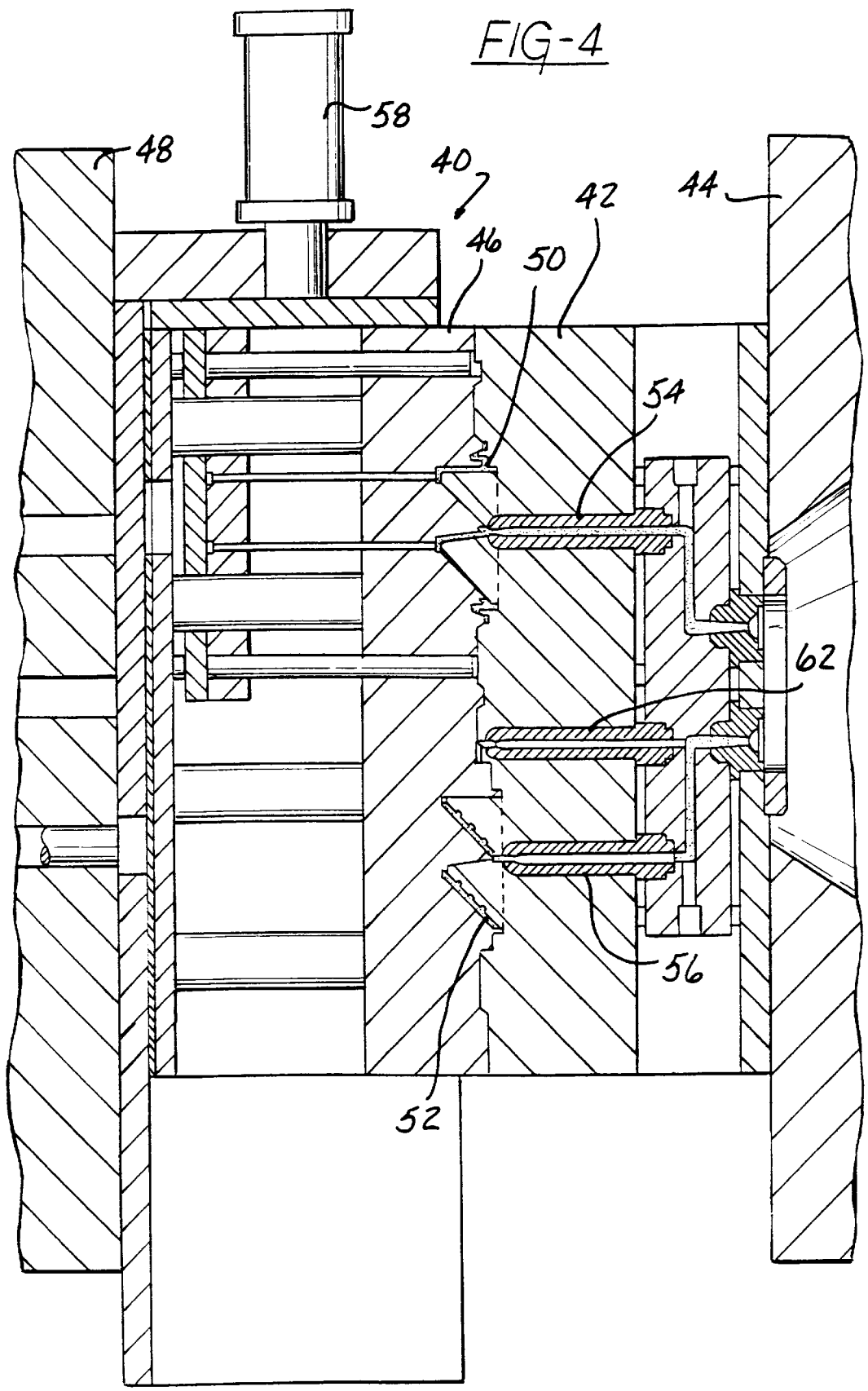
FIG. 4 is a cross-sectional elevation view of a multi-cavity molding tool used in the invention molding process with left and right mold halves in a first closed position.

The housing 12 comprises a substantially rectangular outer frame 12a which defines a central air passageway 12b. The air passageway 12b is divided into several sub-passageways by a grid-like pattern of cross-members 12c extending between the opposite sides of the frame. The upwardly facing surfaces of the cross-members 12c (as viewed with the valve 10 oriented as shown in FIGS. 1 and 2) surrounding the sub-passageways define valve seats 16 upon which the flaps 14 lie when the flaps are in a closed position as shown in FIG. 1. A flange 18 extends outwardly from the frame 12a around substantially the entire perimeter thereof. A plurality of locking tabs 20 are disposed at spaced locations around the frame immediately below the flange 18 (see FIG. 3). Each locking tab 20 has a latching surface 20a extending outwardly from the frame 12a and a bevelled surface 20b slanting back inwardly. Holes 22 are formed through the flange 18 directly above the locking tabs 20 to permit the tabs to be formed during the injection molding process. Four channels 24 are molded in the housing 12, extending up the interior faces of the frame 12a from the valve seats 16, wrapping over the top edge of the frame, and extending outwardly to the edge of the flange 18.

The flaps 14 are generally rectangular and have smooth, flat lower surfaces. Ribs 26 are formed on the upper surfaces of the flaps 14 to add stiffness. One of the long edges of each flap is designated the attachment edge 28, this being the edge that is to be secured to the housing 12. A living hinge 30 is formed parallel to and immediately adjacent the attachment edge 28 of each flap 14. A living hinge is a line of reduced cross-sectional thickness to give the flap greater flexibility at a specific location. The flap 14 is able to bend freely about the living hinge 30 and so move between closed and open positions relative to the housing 12. The remaining edges of each flap 14 are of a reduced thickness as compared to the rest of the flap to form tapered edges 32 for contacting the valve seats 16. (see FIG. 3). The cross-section of the tapered edges 30 may be concave or convex with respect to the valve seats 16. The tapered edges 32 achieve a more effective seal with the valve seats 16 of the housing 12 when the flaps 14 are closed, and also reduce the amount of noise made when the flaps contact the valve seats upon closing.

The retainer and seal assembly 15 is composed of a relatively pliable material such as thermoplastic elastomer and, as described more fully hereinbelow, is formed as a single, integral piece by injection molding. A rectangular seal portion 15a of the assembly 15 surrounds the periphery of the housing flange 18. Two retainer strips 15b extend across the width of the housing 12 on top of the valve seats 16 adjacent the attachment edges 28 of the flaps 14. When the retainer strips 15b are molded in place, they bond to the valve seats 16 and to the attachment edges 28 of the flaps 14 to secure the components together. Runners 15c are molded in place within the channels 24 in the housing 12, connecting the retainer strips 15b to the seal portion 15a to provide a flow path for the fluid thermoplastic material during injection. The runners 15c are disposed completely within their respective channels 24, so that they do not project past the surface of the housing 12. Accordingly they do not interfere with the movement of the flaps 14 toward the open position. Blocks 15d extend from the seal 15a and fill the holes 22 in the flange 18.

The pressure relief valve 10 is installed within an aperture in a panel (not shown) by urging the valve into the aperture such that the seal 15a contacts the outer surface of the panel to prevent leakage of air between the rim of the aperture and the outside of the frame 12a. Locking tabs 20 are deflected inwardly slightly as the bevelled surfaces 20b make contact with the interior edges of the aperture, and snap back outwardly so that the latching surfaces 20a engage the inner surface of the panel once the valve is fully seated in the aperture. The engagement of the locking tabs 20 with the panel serves to retain the valve 10 securely in place. When the valve is seated in the aperture, portions of the blocks 15d immediately adjacent the locking tabs 20 (see FIG. 3) are compressed inwardly by contact with the panel, adding to the tightness of the fit and reducing vibration and noise.

Although the invention is described in relation to a pressure relief valve 10 having two valve flaps 14, it is to be understood that this is not a limitation on the scope of the invention and that the described molding process may be utilized to form valves having any number and configuration of flaps.

FIGS. 4–10 depict the multi-cavity molding tool 40 used to produce the invention pressure relief valve 10 and the sequence of steps in the manufacture of the valve. The molding tool 40 comprises a right mold half 42 mounted on a stationary platen 44 and a left mold half 46 mounted on a movable platen 48 which is movable along a horizontal axis to open and close the mold. When in a first closed position shown in FIG. 4, the mold halves 42,46 define an upper mold cavity 50 and a separate lower mold cavity 52. The upper mold cavity 50 is configured to form the housing 12 portion of the pressure relief valve 10 when a heated, liquid thermoplastic material is injected into the mold through a first drop gate 54 which is fed by a pressure injecting apparatus of the type well known in the injection molding art. The lower mold cavity 52 is configured to form the flaps 14 of the pressure relief valve 10 when a heated, liquid thermoplastic material is injected into the cavity through a second drop gate 56.

To begin the manufacturing process, a first quantity of liquid thermoplastic material is injected into the upper mold cavity 50 and a second quantity of liquid thermoplastic material is injected into the lower mold cavity 52. The material delivered to the upper mold cavity 50 is preferably one which when cooled and set forms a relatively hard, rigid plastic part. Polypropylene is an example of an acceptable material. The material delivered to the lower mold cavity 52 is preferably one which when cooled forms a relatively soft, pliable part, such as thermoplastic elastomer. The injection of the two quantities of material is preferably performed simultaneously to reduce the amount of time required to manufacture the invention pressure relief valve 10, however the two injections may be performed sequentially if desired.

Figure 5:
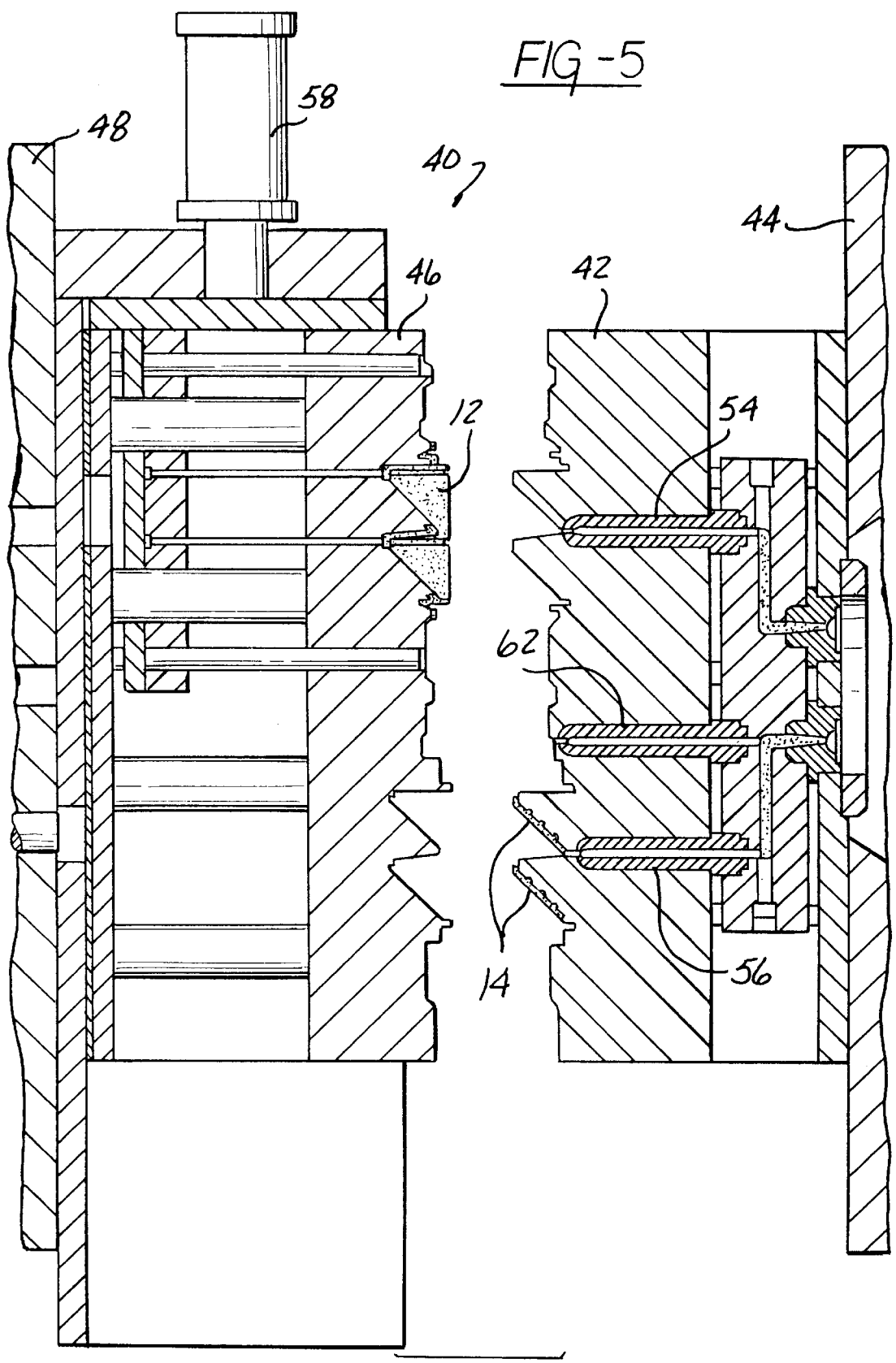
FIG. 5 is a view of the molding tool in a first open position after the housing and flaps have been molded.

After the two quantities of thermoplastic material have cooled and set sufficiently, the mold is opened by moving the movable platen 48 to the left, away from the stationary platen 44, to the position seen in FIG. 5. The upper mold cavity 50 is designed using techniques well known in the injection molding art such that the housing 12 will remain in contact with the left mold half 46 when the mold is opened. The lower mold cavity 52 is designed, using similar techniques, such that the flaps 14 will remain in contact with the right mold half 42 when the mold is opened.

Figure 6:
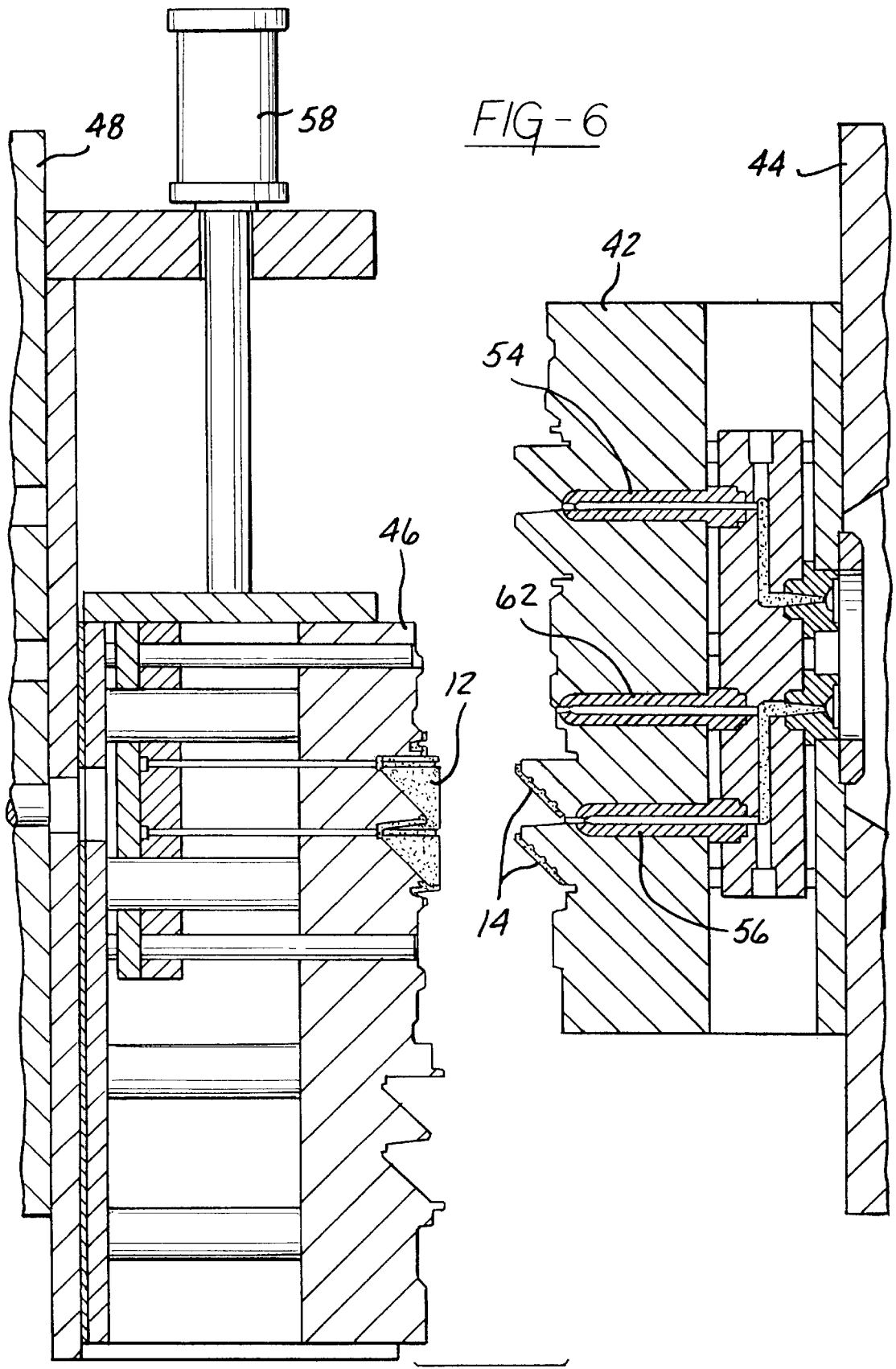
FIG. 6 is a view of the molding tool in a second open position with the left mold half shifted downward with respect to the right mold half.

With the mold in the open position, a hydraulic ram 58 mounted to the movable platen 48 is extended to slide the left mold half 46 downwardly as seen in FIG. 6. This movement places the housing 12 and flap 14 components in alignment with one another along a horizontal axis.

Figure 7:
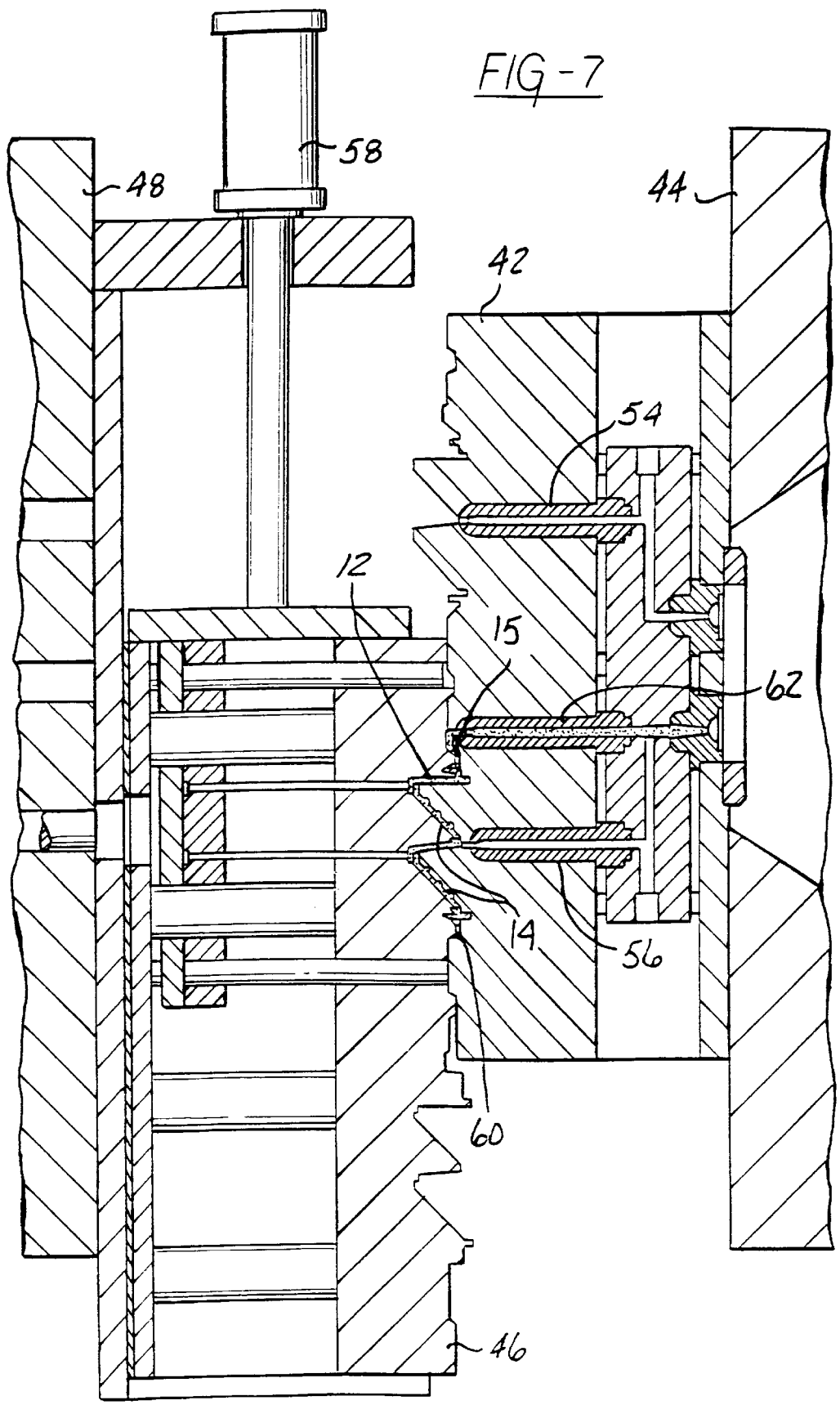
FIG. 7 is a view of the molding tool in a second closed position with the flaps inserted into the housing.
Figure 8:
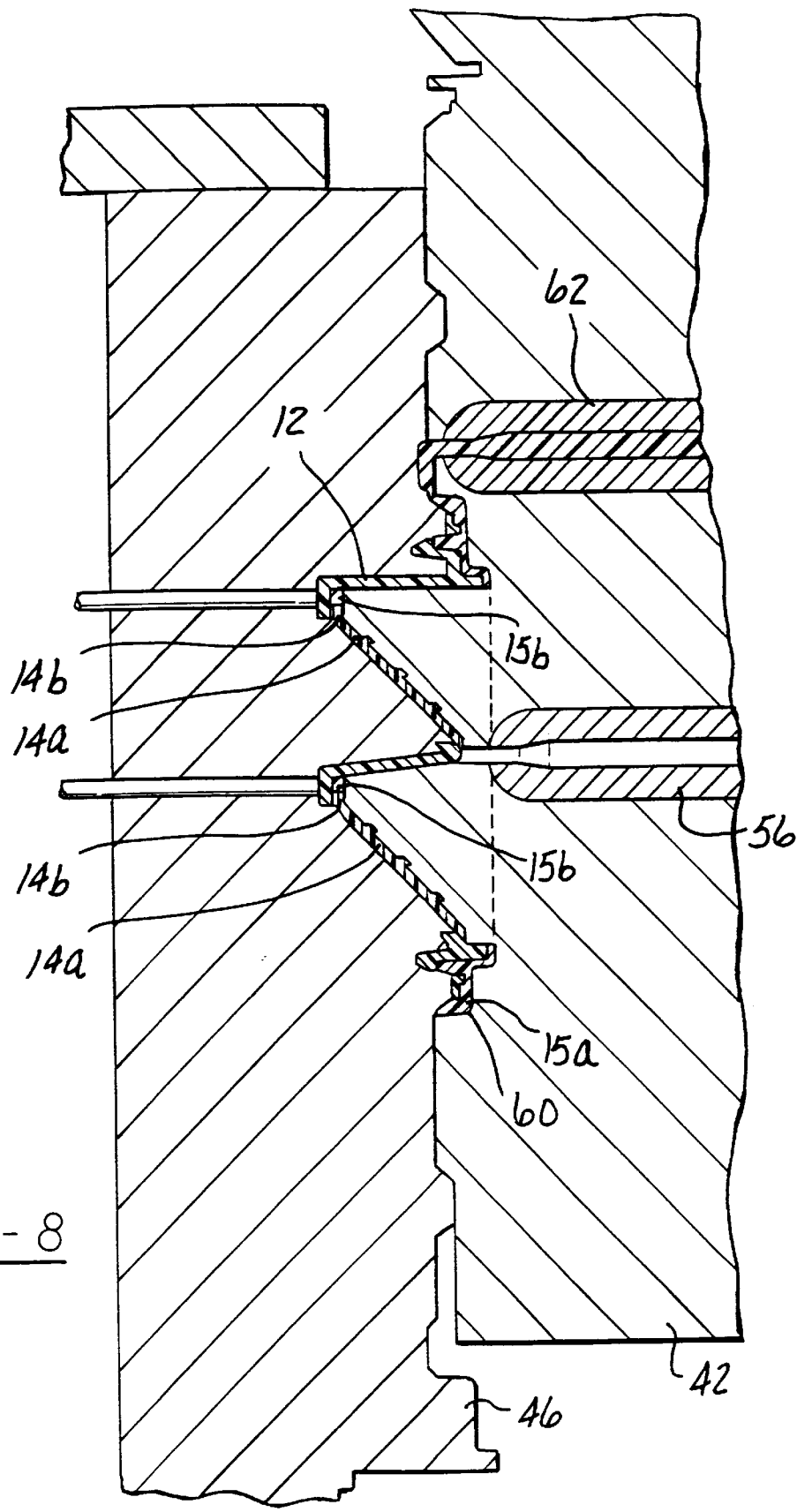
FIG. 8 is a detail view of the molding tool as shown in FIG. 7.

Next, the movable platen 48 is moved to the right such that the two mold halves 42,46 mate with one another in a second closed position, as shown in FIGS. 7 and 8. In this position, the flaps 14 are inserted into the interior of the housing 12 such that the attachment edges 28 of the flaps 14 are in close proximity with the valve seats 16, as they are to be positioned in the finished part. The attachment edges 28 of the flaps 14 may be placed in contact with their respective valve seats 16, or a small gap may be left between the parts if desired.

In the second closed position, the left and right mold halves 42,46 also form a third mold cavity 60 which contacts the housing 12 and flaps 14 and is a "negative" of the seal and retainer assembly 15. A third quantity of liquid thermoplastic material is injected into the third mold cavity 60 through a third drop gate 62. As the third quantity of thermoplastic material cools and sets, it bonds with the housing 12 along all of the surfaces of mutual contact therewith, and also with the attachment edges 28 of the flaps 14 where it contacts these components. Accordingly, the setting of the third quantity of thermoplastic material secures the flaps 14 in connection with the housing 12 and secures the seal in its proper position on the flange 18.

Figure 9:
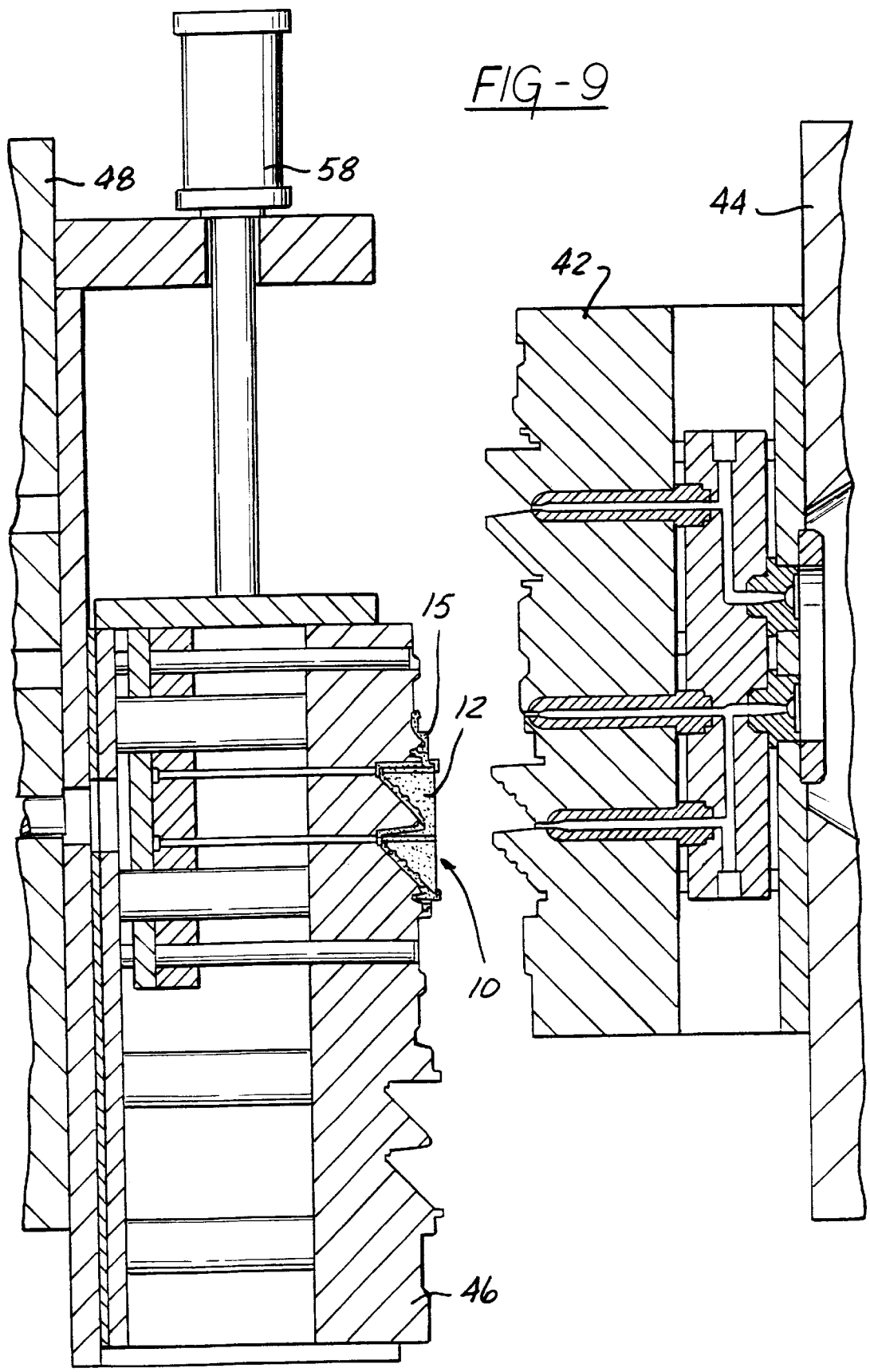
FIG. 9 is a view of the molding tool in an open position, with the completed valve still in the left mold half.

When the third quantity of thermoplastic material has cooled and set sufficiently, the mold halves 42,46 are opened, as seen in FIG. 9, and the completed pressure relief valve 10 is ejected from the mold by means of knock-out rods 64, see FIG. 10. The hydraulic ram 58 is then retracted to raise the left mold half 42 and the mold halves 42,46 are closed once again to permit the molding cycle to be repeated to form another part.

FIGS. 11 and 12 depict a tool 140 which allows the simultaneous production of four valves according to the present invention. The tool 140 operates in the same general manner as is described hereinabove with regard to FIGS. 4–10, but the mold halves 142,146 form eight separate mold cavities—the upper four cavities 150a–d forming four identical copies of the housing 12 and the lower four cavities 152a–d forming four identical copies of the flaps required for each valve 10. With the left mold half 146 in the raised position seen in FIG. 11, a first quantity of thermoplastic material is injected into the four upper mold cavities 150a–d and a second quantity of thermoplastic material is injected simultaneously into the four lower mold cavities 152a–d. FIG. 12 depicts the configuration of the tool 140 after the hydraulic ram 158 has been extended to move the left mold half 146 to the lowered position and place the four housings in alignment with their respective flaps. As will be apparent to one of skill in the injection molding art, the tool 140 depicted in FIGS. 11 and 12 is well adapted to use in a commercial environment since it allows more rapid mass production of pressure relief valve.

Figure 15:
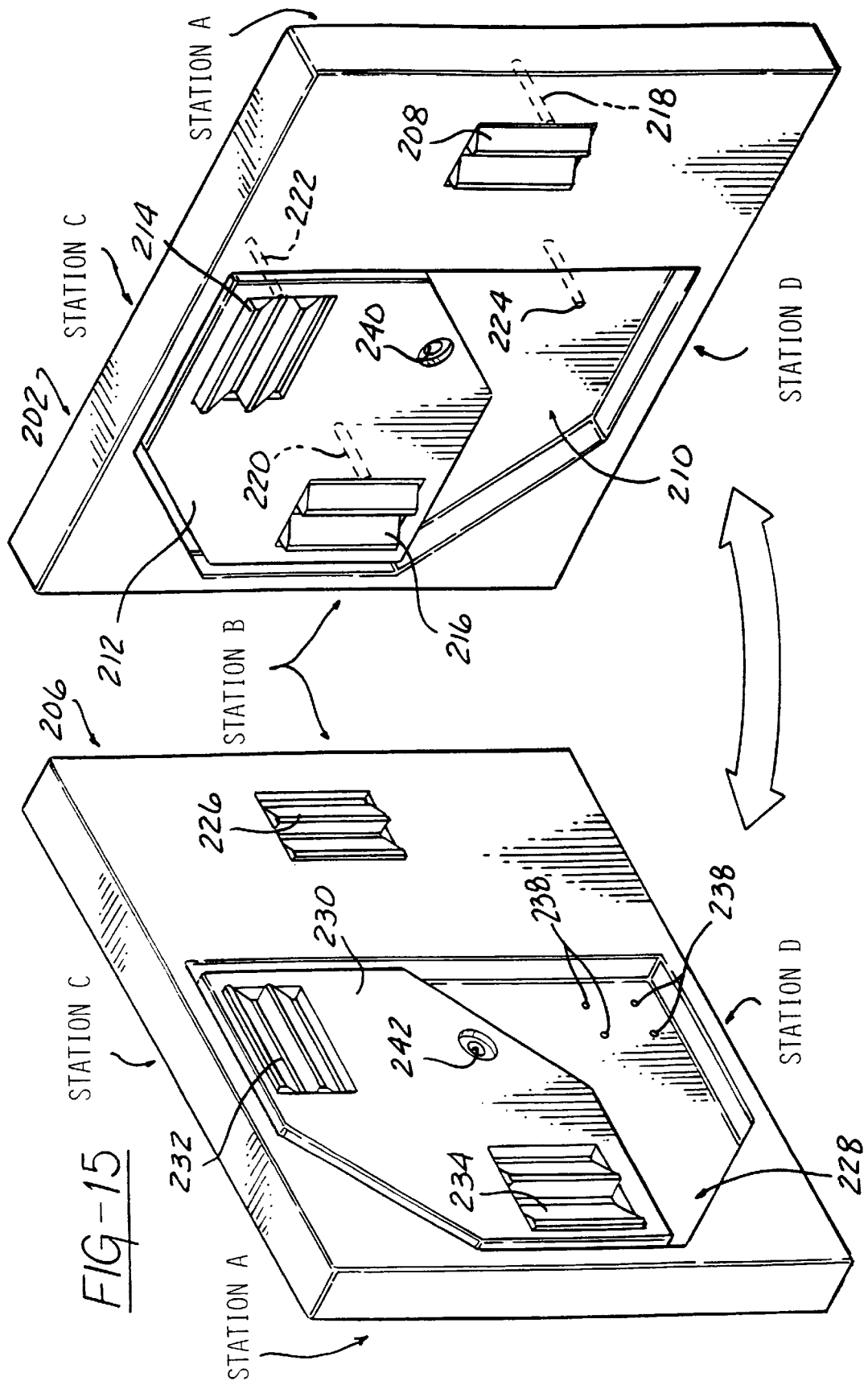
FIG. 15 is a view of the molding tool of FIG. 13 with pivot plates in a second position.

FIGS. 13–19 depict an alternative embodiment of a molding tool 200 for producing the invention pressure relief valve. As with the molding tool 40 depicted in FIGS. 1–10, the molding tool 200 comprises a right mold half 202 mounted on a stationary platen 204 and left mold half 206 mounted on a movable platen 208 which is slidable along a horizontal axis to open and close the mold (see FIG. 19). For clarity, however, FIGS. 13–15 show the right and left mold halves 202,206 rotated away from each other about a vertical axis, like the pages of a book, to expose the mating inner surfaces of both halves 202,206. The molding tool 200 has four mold stations spaced 90° apart from one another around the periphery of the tool, these stations being identified by the letters A–D for descriptive purposes.

At mold station A, the inner surface of the right mold half 202 has a cavity 208 for molding a housing according to the present invention. A clearance pocket 210 is formed in the inner surface of the right mold half 202, extending over mold stations B, C and D. A pivot plate 212 is retained in the clearance pocket 208 and has two identical sets of cavities 214, 216 for molding flaps according to the present invention. Four drop gates 218,220,222,224 penetrate the right mold half 202, one at each of the four stations A–D.

The left mold half 206 has a mold core 226 for forming flaps according to the present invention located at station B, and a clearance pocket 228 extending over stations A, C and D. A pivot plate 230 is retained in the clearance pocket 228 and has two identical sets of cores 232,234 for molding housings according to the present invention. Knock-out rods 236,238 penetrate the left mold half 206 adjacent mold stations C and D.

Figure 18:
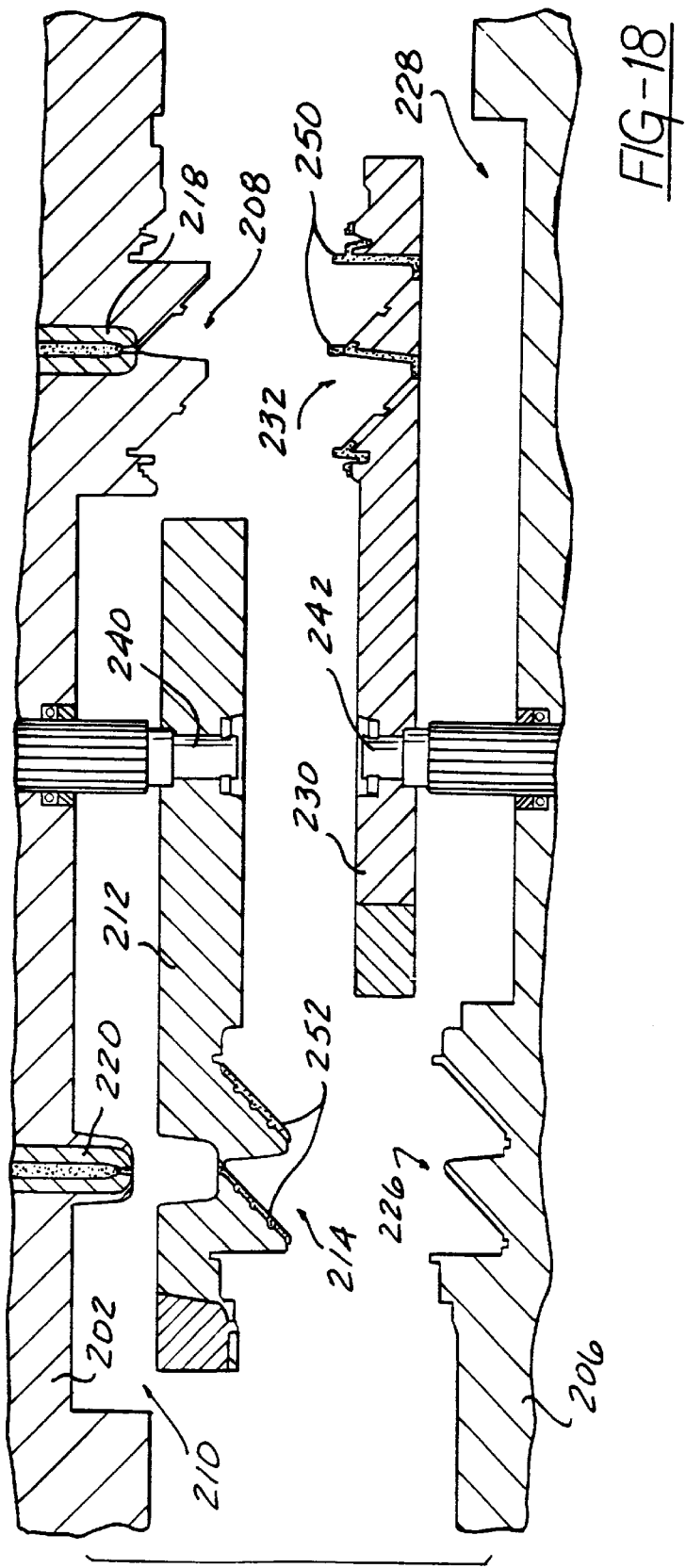
FIG. 18 is a horizontal cross-section through the molding tool of FIG. 13, with the mold halves in an open position and the pivot plates extended.
Figure 19:
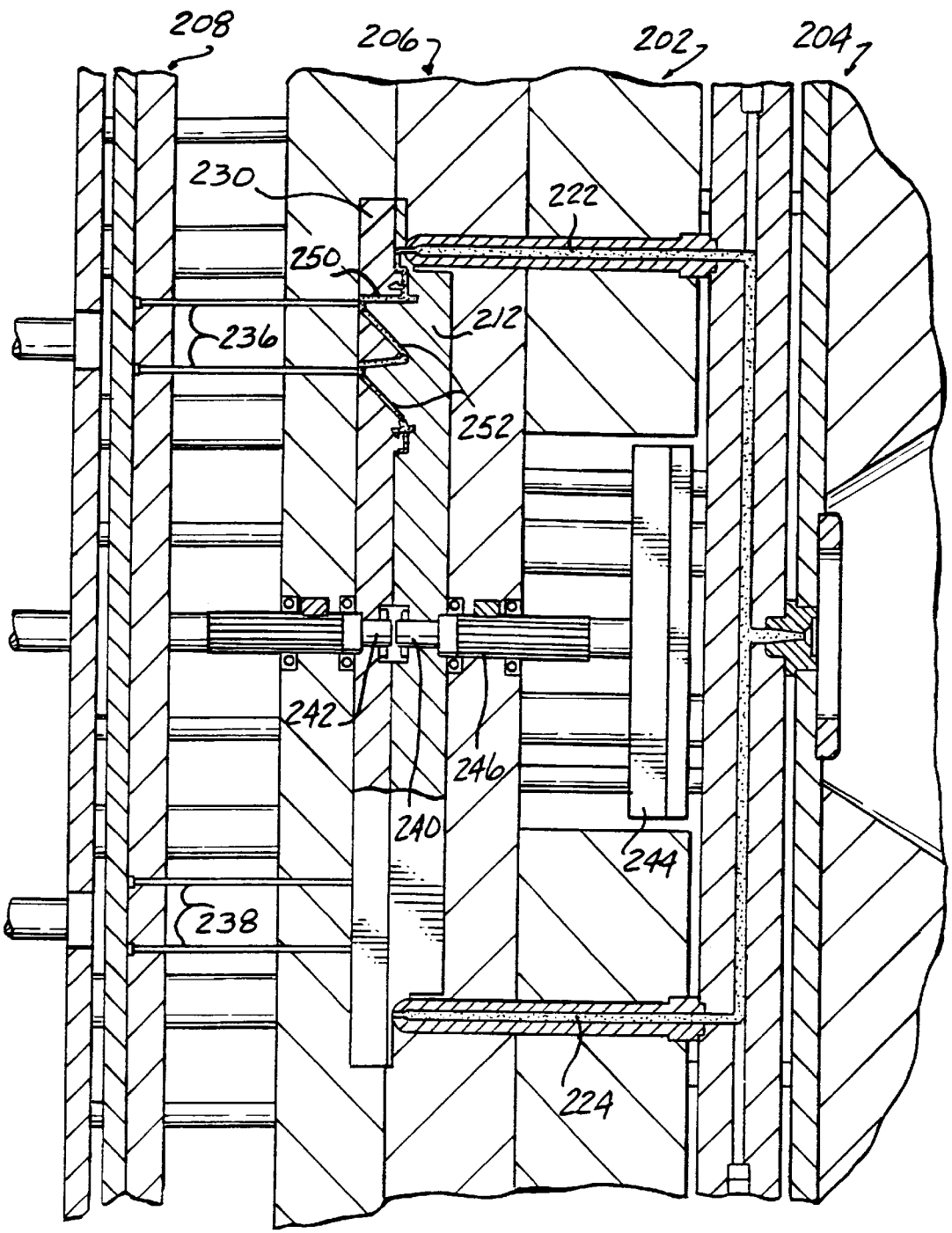
FIG. 19 is a vertical cross-section through the molding tool of FIG. 13, with the mold halves closed and the pivot plates rotated to the second position.

The pivot plates 212,230 are mounted on respective shafts 240,242 each of which is extended and retracted by powered means such as a hydraulic ram 244 (see FIG. 19) and rotated by a rack-and-pinion drive system 246. As seen in FIG. 14 and 18, the pivot plates 212,230 are rotatable about their shafts 240,242 after the shafts are extended a distance sufficient to move the plates 212,230 out of their respective clearance pockets 210,228.

To begin the molding process, the pivot plates 212,230 are positioned in their respective clearance pockets 210,228 as shown in FIG. 13 and the molding tool 200 is in the closed position wherein the left and right mold halves 202,206 are in contact with one another. In this configuration, the housing mold cavity 208 at station A of the right mold half 202 and the housing mold core 232 of the left pivot plate 230 located a station A mate with one another to form a complete housing mold. Similarly, the flap mold cores 226 at station B of the left mold half 206 mate with the flap mold cavities 214 of the right pivot plate located at station B. A first quantity of liquid thermoplastic material is injected through drop gate 218 into the mold at station A to form a housing 250 (see FIG. 16) and, simultaneously, a second quantity of thermoplastic material is injected through drop gate 220 into the mold at station B to form a set of valve flaps 252.

After the two quantities of thermoplastic material have cooled and set sufficiently, the mold halves 202,206 are opened. The just-formed valve flaps 252 remain in contact with the cavities 214 of the right pivot plate 212 and the just-formed housing 250 remains in contact with the cavity 232 of the left pivot plate 230. The shafts 240,242 of both mold halves 202,206 are then extended to move the pivot plates 212,230 out of their respective clearance pockets 210,228 (see FIGS. 14 and 18). The rack-and-pinion mechanisms 246 are then actuated to rotate the shafts 240,242 and pivot plates 212,230 through 90°, and the shafts 240,242 are retracted again to place the pivot plates 212,230 in the positions shown in FIG. 15. This places the flaps 252 carried by the right pivot plate 212 and the housing 250 carried by the left pivot plate 230 in alignment with one another at station C.

The left and right mold halves 202,206 are then moved toward one another to the closed position, inserting the flaps 252 into the interior of the housing 250. As in the first embodiment of the molding tool 40 described hereinabove, this also forms a mold cavity which is a "negative" of the seal and retainer assembly. A third quantity of thermoplastic material is now injected through drop gate 222 at station C to form the seal and retainer assembly 254 which bonds the housing 250 and flaps 252 together. Simultaneously with this third injection to complete the pressure relief valve at station C, additional injections of thermoplastic material are made through drop gates 218 and 220 to form a second set of flaps at station B and a second housing at station A.

After all three of these quantities of thermoplastic material have cooled and set, the left and right mold halves 202,206 are opened and knock-out rods 236 extend from the left mold half 206 at station C to eject the completed part. The newly-formed second set of flaps and second housing remain in contact with their respective pivot plates 212,230 when the mold halves 202,206 are opened. The pivot plates 212,230 are then extended from their clearance pockets 210,228, rotated 90° to their starting positions and retracted again to return them to the position shown in FIG. 13, thus placing the second flaps and second housing in alignment with one another at station D. The mold halves 202,206 are closed once again to insert the second flaps into the second housing, and thermoplastic material is injected simultaneously through drop gate 224 to complete the pressure relief valve at station D and through drop gates 218,220 to form a new set of valves and housing at stations A and B respectively. The process is repeated, with three simultaneous injections being made each time the mold halves 202,206 are closed and a completed pressure relief valve being ejected each time the mold halves 202,206 are opened.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A one-way pressure relief valve manufactured by the following process:
   providing a housing made of a relatively rigid plastic material and defining at least one air passageway;
   providing at least one flap made of a relatively pliable plastic material;
   positioning the flap such that a first edge thereof is adjacent a portion of the housing; and
   molding at least one retainer in a position wherein the retainer contacts and is bonded to the first edge of the flap, and contacts and is bonded to the portion of the housing adjacent the first edge, whereby the at least one flap is hingable with respect to the housing about the first edge to alternatively block and unblock the air passageway.

2. The valve according to claim 1 wherein the at least one flap comprises a first section adjacent the first edge and a second section connected to the first section by a hinge formed integrally with both the first and second sections, the first section being secured to the housing by the retainer and the second section movable relative to the first section about the hinge.

3. The valve according to claim 1 wherein the at least one flap comprises at least one stiffener rib disposed on a surface thereof.

4. The valve according to claim 1 wherein the at least one flap comprises a second edge for sealing contact with a valve seat of the housing, the flap tapering from a first thickness over a majority of the flap to a smaller thickness adjacent the second edge.

5. The valve according to claim 1 further comprising a seal molded integrally with the retainer, the seal bonded to the housing around a perimeter thereof.

6. The valve according to claim 5 wherein the seal and the retainer are connected by at least one runner which is molded into a channel formed in the housing such that the runner does not project past a surface of the housing.

7. The valve according to claim 1 wherein the housing comprises:

a frame surrounding the at least one flap;

a flange extending outwardly from the frame and having at least one hole passing therethrough; and at least one latch tab extending outwardly from the frame at a position adjacent to and in alignment with the hole.

8. The valve according to claim 7 wherein a block of relatively pliable thermoplastic material is molded in place within the hole and proximate a latching surface of the at least one latch tab, whereby the relatively pliable thermoplastic material contacts a panel in which the valve is mounted and reduces vibration.

9. A one-way pressure relief valve for use in an automotive vehicle comprising:

a housing formed of a first relatively rigid plastic material and having a peripheral frame defining a valve seat surrounding an interior air passageway, and a flange extending outwardly from the frame;

at least one flap formed of a second relatively pliable plastic material and having a first section adjacent a first edge of the flap and a second section connected to the first section by a hinge formed integrally with both the first and second sections, the first section contacting the valve seat;

a retainer strip formed of the second plastic material, the strip molded-in-place in contact with the first section of the flap and with the housing immediately adjacent the first section to bond the first section to the housing, the second section of the flap being moveable about the hinge between a closed position wherein it contacts the valve seat to block the passageway and an open position wherein it does not contact the valve seat and does not block the passageway; and a seal formed of the second plastic material and molded integrally with the retainer strip, the seal extending around and bonded to the frame.

* * * * *